United States Patent
Thaden et al.

(10) Patent No.: US 10,197,136 B2
(45) Date of Patent: Feb. 5, 2019

(54) REVERSAL MECHANISM FOR A ROLLING RING DRIVE

(71) Applicant: JOACHIM UHING GMBH & CO. KG, Mielkendorf (DE)

(72) Inventors: Florian Thaden, Budelsdorf (DE); Paul Beutin, Krummwisch (DE); Hauke Reese, Wasbek (DE)

(73) Assignee: JOACHIM UHING GMBH & CO. KG (DE)

(*) Notice: Subject to any disclaimer, the term of this patent is extended or adjusted under 35 U.S.C. 154(b) by 269 days.

(21) Appl. No.: 14/767,091

(22) PCT Filed: Feb. 24, 2014

(86) PCT No.: PCT/EP2014/053562
§ 371 (c)(1),
(2) Date: Aug. 11, 2015

(87) PCT Pub. No.: WO2014/128302
PCT Pub. Date: Aug. 28, 2014

(65) Prior Publication Data
US 2015/0377328 A1      Dec. 31, 2015

(30) Foreign Application Priority Data
Feb. 22, 2013   (GB) .................................. 1303178.6

(51) Int. Cl.
*F16H 19/02* (2006.01)
*B65H 54/28* (2006.01)

(52) U.S. Cl.
CPC ....... *F16H 19/025* (2013.01); *B65H 54/2866* (2013.01); *B65H 54/2884* (2013.01)

(58) Field of Classification Search
CPC .................................................... F16H 19/025
USPC ................ 74/25, 27; 15/104.33; 324/207.24
See application file for complete search history.

(56) References Cited

U.S. PATENT DOCUMENTS

| | | | | |
|---|---|---|---|---|
| 2,578,026 A | * | 12/1951 | Taylor | B64D 13/02 454/73 |
| 2,619,346 A | * | 11/1952 | Schmalzriedt | F16H 19/025 160/188 |
| 2,940,322 A | * | 6/1960 | Uhing | B23Q 1/40 346/139 R |
| 3,820,110 A | * | 6/1974 | Henrich | G01D 5/2013 235/450 |
| 3,977,258 A | * | 8/1976 | Bauer | B65H 54/2866 242/480.8 |
| 4,034,613 A | * | 7/1977 | Halfhill | G11B 5/5521 74/25 |

(Continued)

FOREIGN PATENT DOCUMENTS

DE   202007007700   8/2007
EP       0518043    12/1992

(Continued)

*Primary Examiner* — William C Joyce
(74) *Attorney, Agent, or Firm* — Cook Alex Ltd.

(57) ABSTRACT

Reversal mechanism for a rolling ring drive. A reversal mechanism for a rolling ring drive (10) comprising a motor (12) attached to an inner ring housing (16), a controller controlling the angle of the rolling rings via the motor (12) in dependence upon a sensor which detects the position of the rolling ring drive (10) and other desired parameters.

6 Claims, 2 Drawing Sheets

(56) References Cited

U.S. PATENT DOCUMENTS

| | | | | |
|---|---|---|---|---|
| 4,222,619 | A | * | 9/1980 | Nilsson ................ F16H 19/025 |
| | | | | 74/25 |
| 4,347,792 | A | * | 9/1982 | Nagahori ............. B61B 13/125 |
| | | | | 104/166 |
| 4,450,731 | A | * | 5/1984 | Wardley ............... F16H 19/025 |
| | | | | 74/25 |
| 4,557,432 | A | * | 12/1985 | Ito ......................... B65H 54/28 |
| | | | | 242/476.7 |
| 5,193,949 | A | | 3/1993 | Marantette et al. |
| 5,251,356 | A | * | 10/1993 | Oaki ..................... A61B 1/122 |
| | | | | 15/104.095 |
| 6,682,432 | B1 | * | 1/2004 | Shinozuka ............ F16B 2/065 |
| | | | | 403/222 |
| 2010/0031460 | A1 | * | 2/2010 | Eisermann ............ B08B 9/045 |
| | | | | 15/104.33 |

FOREIGN PATENT DOCUMENTS

| | | |
|---|---|---|
| WO | WO2007/129347 | 11/2007 |
| WO | WO2012/132817 | 10/2012 |

* cited by examiner

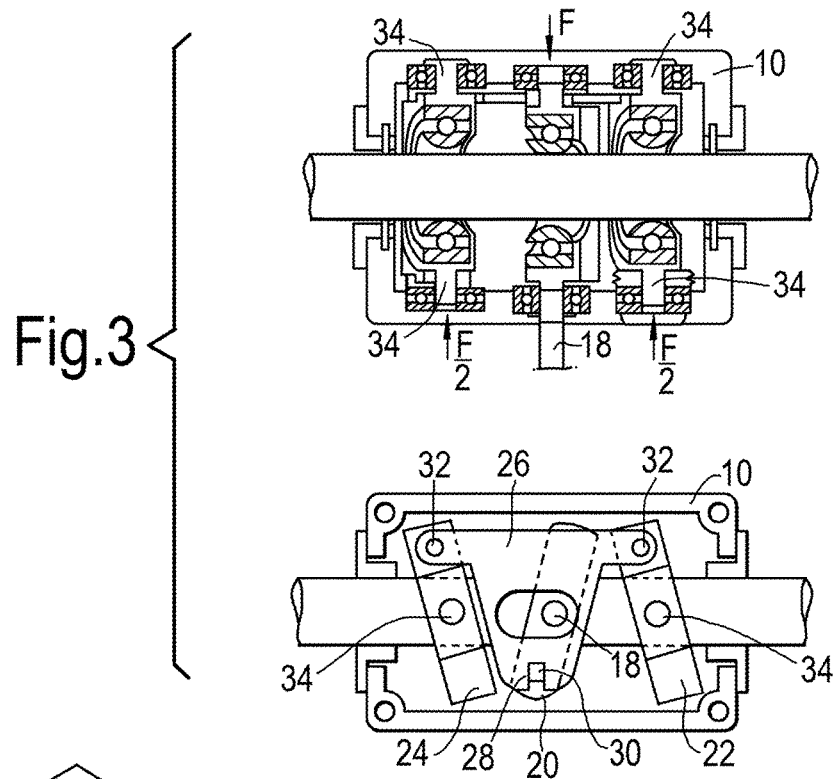
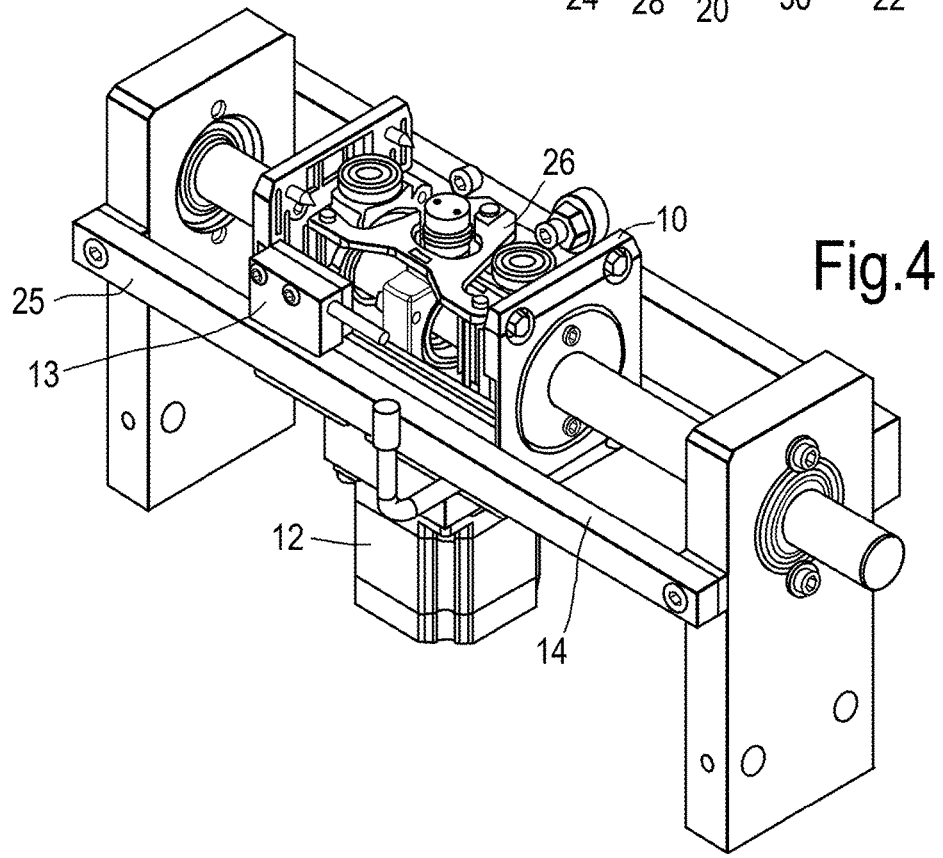

REVERSAL MECHANISM FOR A ROLLING RING DRIVE

The present invention is directed to the reversal mechanism for a rolling ring drive.

Rolling ring drives are a common method of converting rotary motion to linear motion. Such drives are often used with regard to coiling wire and such like. The rolling ring drive proceeds in one direction whereupon its direction of travel is reversed by flipping the rings contained within the rolling ring drive. Previously such reversal mechanisms have been entirely mechanical and the reversal of rings has been achieved by a lever attached to the reversal mechanism hitting a stop and the direction of travel of the drive thereby reversing as the rolling rings inside are rotated by spring-loaded mechanical mechanism. This has had the problem that considerable shock is introduced into the drive by this mechanical reversal. It has been previously proposed in German Utility Model No. 2004 003501.4 that the lever mechanism for such a mechanical reversal mechanism be replaceable to deal with the breakages that occur due to the mechanical stress.

It is an aim of the present invention to provide a reversal mechanism which does not have the disadvantages of previously mentioned reversal mechanisms namely the wear on the reversal mechanism and shock to the drive upon contact with a fixed stop.

Accordingly the present invention is directed to a reversal mechanism for a rolling ring drive comprising a motor attached to an inner ring housing, a controller controlling the angle of the rolling rings via the motor in dependence upon a sensor which detects the position of the rolling ring drive and other desired parameters.

This provides the advantage that the motor alters the pitch of the rolling rings in a controlled constant manner thus avoiding the mechanical shock to the drive and leading to smoother reversal of direction. This results in significantly less wear to the rolling ring drive. Preferably the motor is a stepper motor.

In a preferred embodiment the position detection system comprises a magnetic incremental measuring system with a scanning head. This provides a simple positional system that can be easily fitted to indicate the position of the rolling ring drive. This provides the further advantage if the rolling ring drive is further equipped with a non-contact flange detection mechanism. This enables the valley or mountain formation on any winding material to be compensated for by the rolling ring drive. The pitch of the rolling ring drive merely needs adjusting to greater or lesser extent with the shaft at constant speed.

Therefore the motor allows significantly more control over the mechanism to ensure smooth running of any winding process.

An example of a reversal mechanism for a rolling ring drive will now be discussed in conjunction with the attached drawings in which:

FIG. 3 shows a cross-section through the rolling ring drive equivalent to that shown in FIG. 1, below it is shown a plan view of the rolling ring drive taken from the side opposite the motor with the cover removed; and FIG. 4 shows the perspective view shown in FIG. 4 where the cover of the rolling ring drive has been removed.

Rolling ring drives are an adhesion transmission drive, which converts the rotary movement of a constantly rotating smooth shaft by means of rolling rings, which roll at an adjustable pitch angle on the shaft into a stroke movement. The rolling ring drive acts like nuts on screw spindles, but have a fine-pitch adjustment that can go to left or right and also be close to zero. The pitch is corrected by swivelling rolling rings, which roll their geometry and pressure at the shaft surface.

Figure 1:
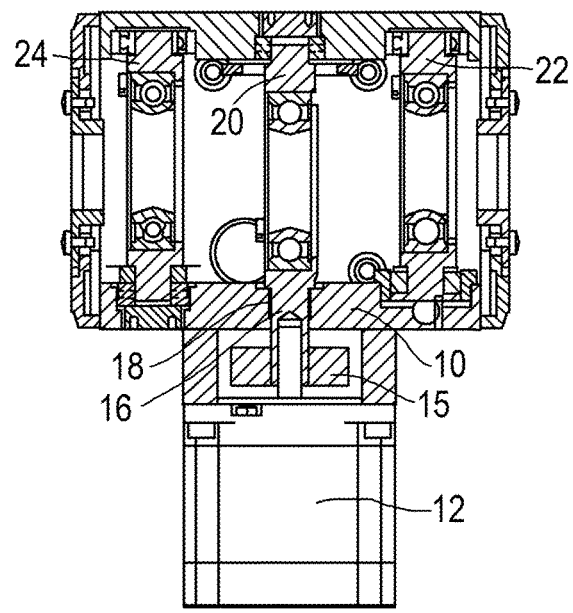
FIG. 1 shows a cross-section through a rolling ring drive.

In FIG. 1 the stepper motor 12 is attached to the side of the rolling ring drive 10 instead a standard mechanical reversal system. The stepper motor 12 is connected to an inner ring housing 16 of the rolling ring drive 10 by a clamping ring 15. The clamping ring is attached to a shaft 18 which is attached to the central rolling ring 20. The central rolling ring 20 is mechanically connected to the other two rings 22 and 24. Thus when the shaft 18 is rotated the pitch of all the rings is altered accordingly.

Figure 2:
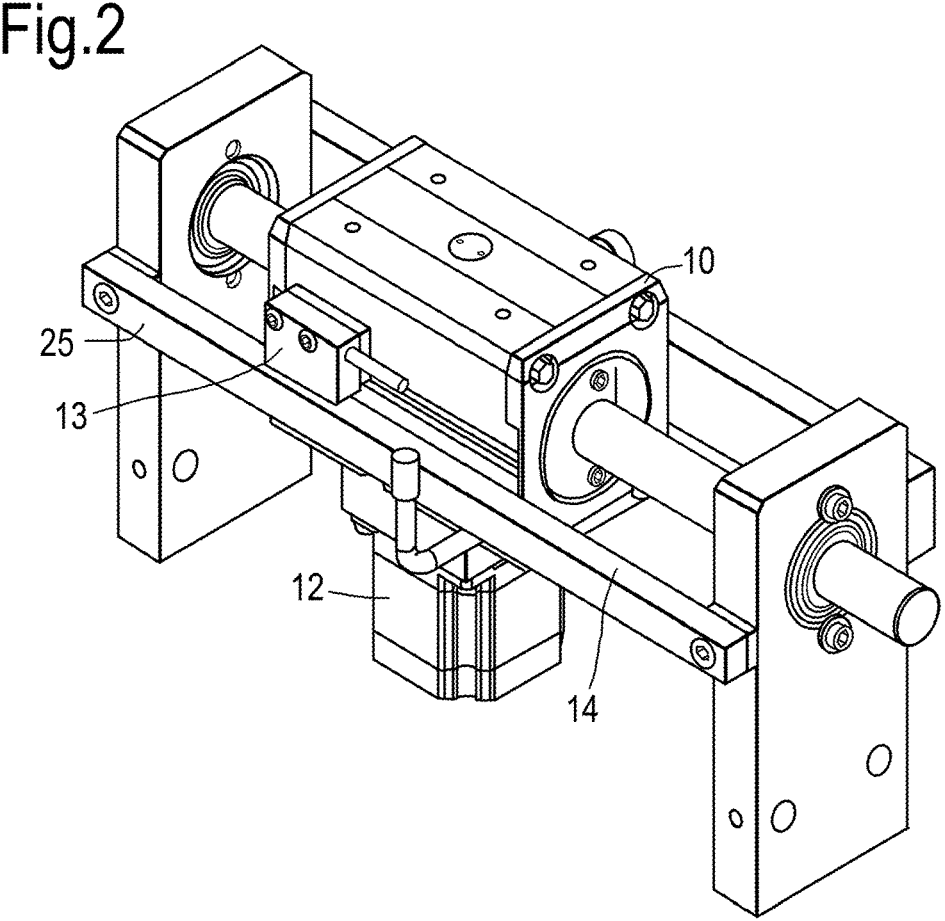
FIG. 2 shows a side perspective view of a rolling ring drive fitted to a rotating shaft with a measuring system attached.

FIG. 2 shows the position control of the rolling ring drive 10. A magnetic incremental measuring system 25 is attached to the side of the rolling ring drive each. The magnetic incremental measuring system 25 comprises a scanning head 13 attached to the side of the rolling ring drive 10, which runs during the stroke over a magnetic strip 14 attached to the outside of the track of the rolling ring drive 10. Thus detecting the portion of the drive and via a control altering the position of the rolling ring drives 22, 24 and 26 via the stepper motor 12.

FIG. 3 shows a cross-section through the rolling ring drive as shown in FIG. 1 in which the journals 34 about which the two outer drives 22 and 24 rotate can be seen. The figure also shows a plan view taken from the top of the rolling ring drive which is opposite to the side on which the motor 12 is mounted. This shows a T-Shaped mechanical linkage 26 which is connected to the rolling ring drive 20 via a notch 28 on the bottom of the T and a protrusion 30 on the central rolling ring drive 20 to it. The mechanical linkage 26 connection has a hole through the center of its T-Shape which is elongate and in which the journal 34 of the central rolling ring drive 20 passes. The two sides of the top of the T are attached to the rolling ring drives 22 and 24 by swivels 32. This means that when the central rolling ring drive is rotated via the motor 12 the other two ring drives 22 and 24 are moved by the mechanical linkage 26.

FIG. 4 shows FIG. 2 with the casing of the rolling ring drive 10 removed this clearly shows the relationship of the motor 12 on the rolling ring drive to be opposite to the mechanical connection 26.

This electronic reversal mechanism for rolling ring drive replaces the mechanical reversal system with a stepper motor reversal mechanism including a control system. In the standard mechanical reversal system the shifting process is triggered by a spring-actuated mechanism, which acts upon contact fixed stops. The key advantage of the present reversal mechanism over the standard mechanical reversal system is that during a stroke, the pitch value and the reversal point (changeover) of the rolling ring drive can be changed individually for special winding or traversing tasks. Winding and traversing tasks with variable parameters during a stroke can be achieved. Pitch value per shaft rotation and the switchover of the rolling ring drive can be changed individually by the step motor control. The exact position or the distance path of the rolling ring drive can be monitored by the controller through an incremental magnetic measure system, a cable sensor, or similar.

By using a stepper motor reversal mechanism you can run speed up and slow down ramps at constant shaft speed by simple pitch control during the stroke. It is also possible through the combination of stepper motor reversal mechanism and position detection of the rolling ring drive to wind several coils side by side to a drive, if the exact reversal points are stored in the controller.

The invention claimed is:

1. A rolling ring drive equipped with a reversal mechanism comprising a stepper motor attached to an inner ring housing, a controller controlling a pitch angle of a central rolling ring and additional respective rolling rings of a rolling ring drive relative to a rotatable shaft extending through the central and additional respective rolling rings via the stepper motor in dependence upon a sensor which detects at least position of the rolling ring drive along the rotatable shaft, wherein the sensor comprises a magnetic incremental measuring system with a scanning head and the pitch angle of the central and additional respective rolling rings and a reversal point of the rolling ring drive along the rotatable shaft are separately changeable by the controller, wherein the stepper motor is attached to a pivotal shaft that is attached to and controls the pitch angle of the central rolling ring, wherein the central rolling ring is connected to a bottom leg of a T-shaped mechanical linkage and each end of a top leg of the T-shaped mechanical linkage is connected to one of the additional respective rolling rings, and wherein the T-shaped linkage has an elongated central hole through which a journal of the central rolling ring passes and relative movement of the journal of the central rolling ring within the elongated central hole is in a direction opposite movement of the T-shaped linkage.

2. The rolling ring drive equipped with a reversal mechanism according to claim 1, in which a position or a distance path of the rolling ring drive along the rotatable shaft is monitored by the controller via the magnetic incremental measuring system.

3. The rolling ring drive equipped with a reversal mechanism according to claim 1, in which the attachment of the stepper motor to the inner ring housing is by a clamping ring, wherein the clamping ring is attached to a shaft which is attached to a central rolling ring that is mechanically connected to additional rolling rings, and rotation of the shaft rotates the pitch angle of all of the rolling rings.

4. The rolling ring drive equipped with a reversal mechanism according to claim 1, wherein the scanning head of the magnetic incremental measuring system is attached to the side of the rolling ring drive and the scanning head runs along a magnetic strip attached to an outside of a track that extends along a path traversed by the rolling ring drive.

5. The rolling ring drive equipped with a reversal mechanism according to claim 1, wherein the central rolling ring is connected to the bottom leg of the T-shaped linkage by a protrusion extending from the central rolling ring that fits within a notch in the bottom leg of the T-shaped linkage.

6. The rolling ring drive equipped with a reversal mechanism according to claim 1, wherein each end of a top leg of the T-shaped mechanical linkage is connected to one of the additional respective rolling rings by a swivel.

* * * * *